No. 735,918. Patented August 11, 1903.

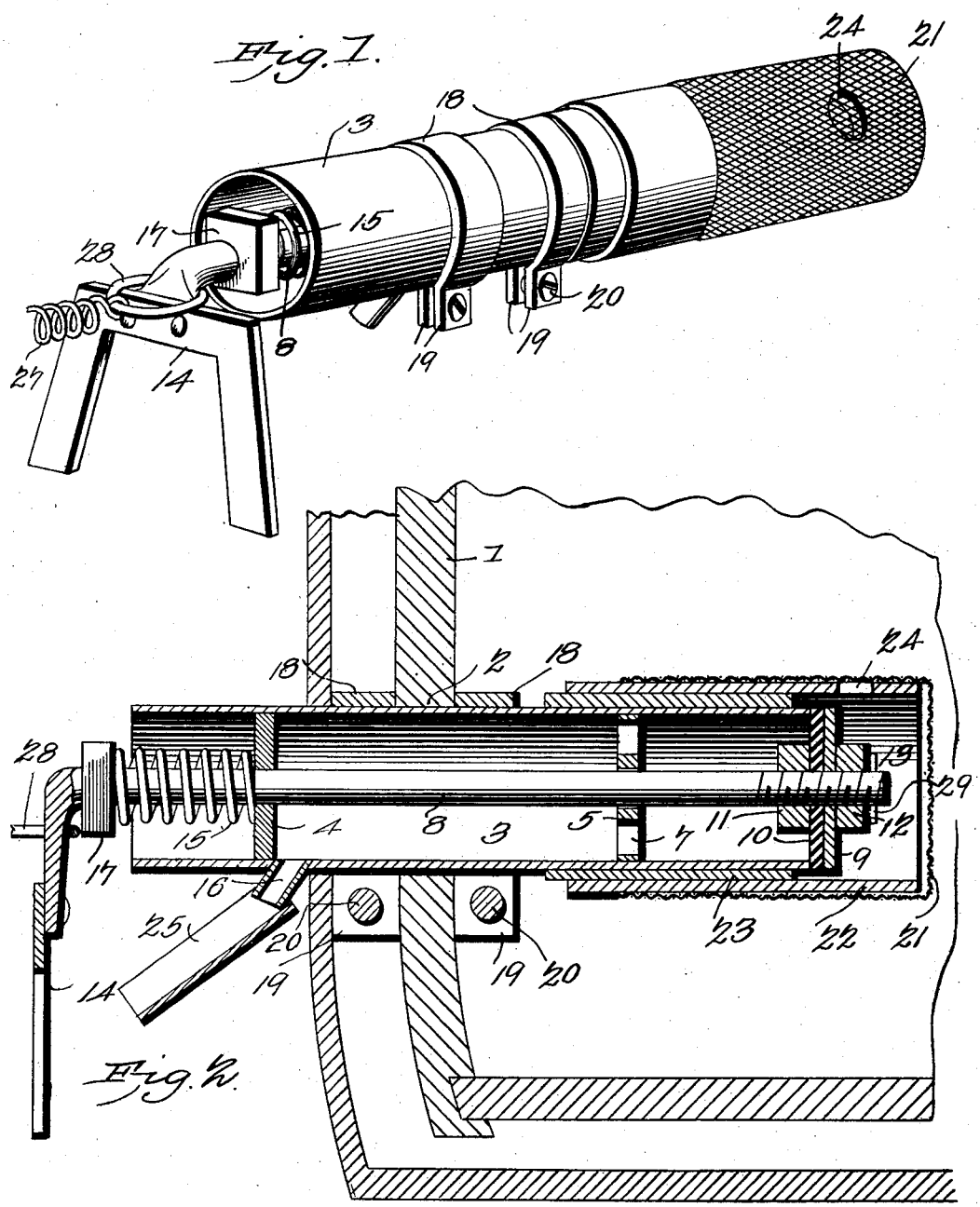

UNITED STATES PATENT OFFICE.

PHILO TIFFANY, OF CHEROKEE, IOWA.

STOCK-WATERING-TANK VALVE.

SPECIFICATION forming part of Letters Patent No. 735,918, dated August 11, 1903.

Application filed January 11, 1902. Serial No. 89,361. (No model.)

*To all whom it may concern:*

Be it known that I, PHILO TIFFANY, a citizen of the United States, residing at Cherokee, in the county of Cherokee and State of Iowa, have invented a new and useful Stock-Watering-Tank Valve, of which the following is a specification.

The invention relates to improvements in stock-watering-tank valves.

The object of the present invention is to improve the construction of valves for controlling the supply of water from a tank or reservoir to a watering-trough and to provide a simple, inexpensive, and efficient device adapted to be readily applied to a barrel or other form of tank or reservoir and adapted to be readily operated by an animal and capable of receiving the snout of a hog and of discharging water substantially into the mouth of the animal.

The invention consists in the construction and novel combination and arrangement of parts hereinafter fully described, illustrated in the accompanying drawings, and pointed out in the claims hereto appended.

In the drawings, Figure 1 is a perspective view of a device constructed in accordance with this invention. Fig. 2 is a vertical sectional view showing the same applied to a portion of a barrel.

Like numerals of reference designate corresponding parts in both figures of the drawings.

1 designates a barrel forming a reservoir or tank and provided near the bottom with an aperture 2, through which extends a horizontal tube 3; but any other form of reservoir may be employed for this purpose, and the said reservoir is designed to be packed in some non-heat-conducting material, such as manure or the like. The tube 3 extends into the reservoir and projects outward beyond the same and is provided with guides 4 and 5, consisting of diaphragms provided with central guide-openings, and the inner one has an aperture 7 for the passage of water. The central guide-openings receive a longitudinally-movable valve-stem 8, which extends entirely through the tube and which is provided at its rear end with a valve which seats itself against the inner end of the tube, whereby the latter is closed. The valve consists of a metal disk 9 and a leather disk or washer 10; but any other form of valve may be employed, and the disks are secured between a pair of nuts 11 and 12, which are arranged on a threaded portion 13 of the inner end of the valve-stem. The outer end of the valve-stem is extended downward and supports an approximately inverted-U-shaped nose-plate 14, which extends downward from the valve-stem and which consists of a horizontal top portion and depending downwardly-diverging sides. A hog may poke its nose through the opening of the plate 14, and by depressing the plate and the valve-stem against the action of a coiled spring 15 the valve is opened and water flows through the tube, which is provided at the bottom with an outlet-opening 16, and the mouth of the animal is located directly beneath this opening. The water flowing through the opening 16 will practically flow into the mouth of the animal, and the waste of water will thereby be reduced to a minimum. The spring which is disposed on the valve-stem is interposed between the outer guide 4 and a stop 17, mounted on the outer portion of the valve-stem and consisting, preferably, of a nut, which is adapted to be adjusted to vary the tension of the spring. The water flowing through the discharge-opening 16 is conducted through the outer end of the tube to enable an animal to obtain it more readily by means of a spout 25, located beneath the tube and inclined downward and outward. The water is prevented from flowing outward through the tube by means of the disk or guide 4, which forms a shield for the spring. In cold weather when it is desired to hold the valve closed tightly a supplemental spring 27 may be employed, and it is connected at one end with the valve-stem by means of a ring 28, arranged on the stem near the plate 14. The other end of the spring is designed to be secured by a stake or any other suitable means for placing the spring under tension. The inner end of the valve-stem is perforated for the reception of a key 29 to prevent the nuts from becoming accidentally unscrewed. The tube is held against longitudinal movement by a pair of clamps 18, arranged at the inner and outer faces of the barrel and provided with perforated terminals 19, connected by bolts 20, which cause the clamps or bands to engage the tube tightly, and the said bands or clamps form stops for preventing any inward or outward movement of the tube.

The device is provided at the inner end of the tube with a strainer 21, consisting of a tube 22 and a covering of wire-gauze or other screen material, and the tube 22, which may be fitted directly on the inner end of the tube 3, preferably has a tube or sleeve 23 interposed between it and the said tube 3. The screen material covers the end of the tube 22, and the latter is also provided with openings 24 to permit the water to flow through the sides of the strainer.

What I claim is—

1. The combination with a water-reservoir, of a discharge-pipe, a valve for closing the inner end of the pipe, a valve-stem adapted to actuate the valve, a guide-plate for the valve-stem constituting a closure for the outer end of the pipe, said pipe having a discharge-opening through its side wall between the valve and guide-plate, and a spring for the valve-stem situated in the discharge-pipe outside of the guide-plate.

2. The combination with a water-reservoir, of a discharge-pipe, a valve for closing the inner end of the pipe, a valve-stem adapted to actuate the valve, a guide-plate for the valve-stem constituting a closure for the outer end of the pipe, a discharge-spout projecting downward and outward from the discharge-pipe between the valve and guide-plate, an operating-plate carried by the valve-stem and adapted to be engaged by the head of the animal for actuating the stem, said plate having an opening which will permit the animal's mouth to occupy a position beneath the discharge-spout, and a spring for the valve-stem situated in the discharge-pipe outside of the guide-plate, whereby the spring will be protected from contact with the water.

In testimony that I claim the foregoing as my own I have hereto affixed my signature in the presence of two witnesses.

PHILO TIFFANY.

Witnesses:
  GEO. A. GREEN,
  LOUIS A. WINEKE.